L. E. SCOTUCCI & P. A. EINARSON.
RESILIENT TIRE.
APPLICATION FILED OCT. 28, 1913.
1,125,191.
Patented Jan. 19, 1915.
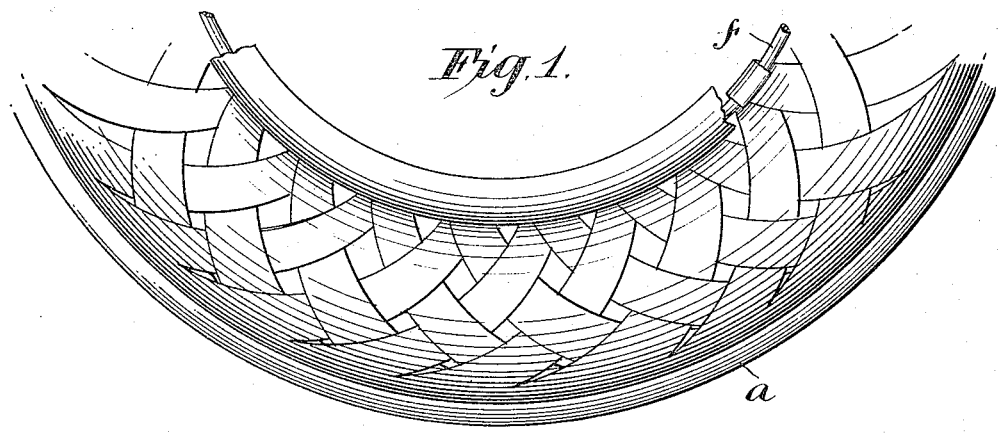
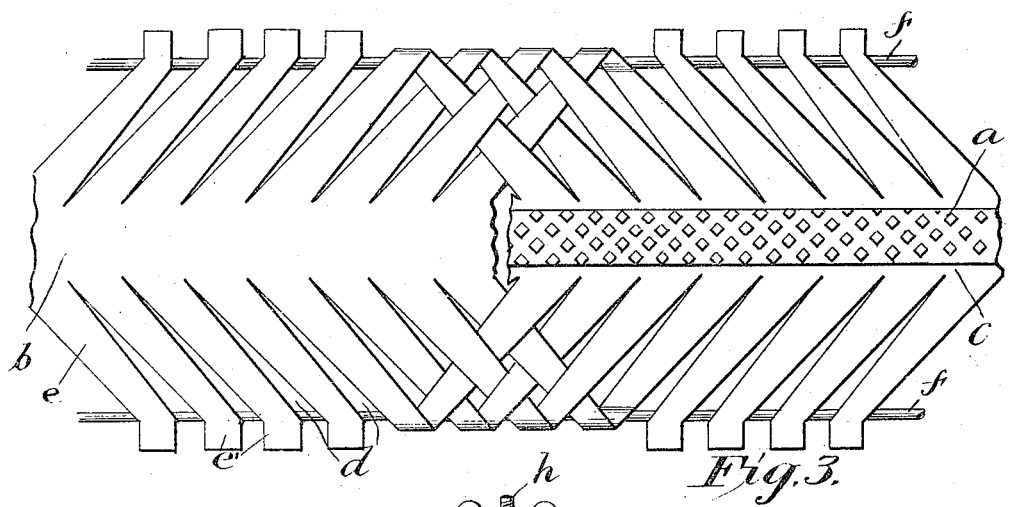
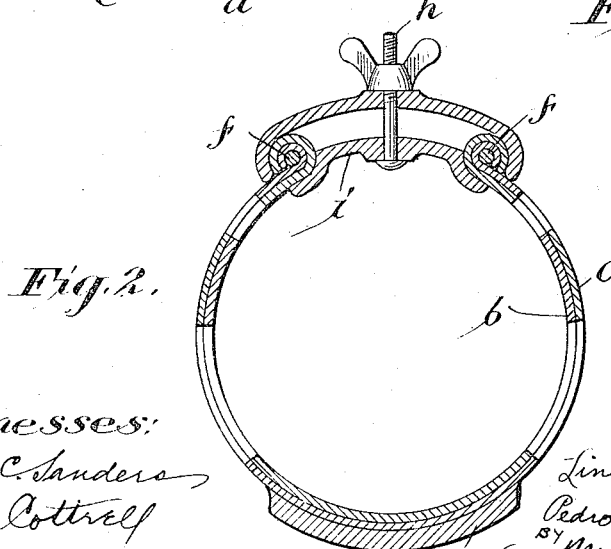

UNITED STATES PATENT OFFICE.

LINO EMIDIO SCOTUCCI AND PEDRO ALFREDO EINARSON, OF BUENOS AIRES, ARGENTINA.

RESILIENT TIRE.

1,125,191. Specification of Letters Patent. Patented Jan. 19, 1915.

Application filed October 28, 1913. Serial No. 797,721.

*To all whom it may concern:*

Be it known that we, LINO EMIDIO SCOTUCCI, a subject of the King of Italy, and PEDRO ALFREDO EINARSON, a subject of the King of Denmark, both residing at No. 671 Calle Maipú, Buenos Aires, Argentina, have invented a Resilient Tire, of which the following is a specification.

The present invention relates to resilient tires, constructed entirely of metal and adapted to be used with advantage on vehicle wheels of any description, in substitution for the common rubber tires, pneumatics and non-skidding covers actually used.

As will hereinafter be seen, owing to the peculiar construction of this tire, different degrees of resiliency or resistance are obtainable, according to the use given to the vehicle whereon the tires are to be placed.

The main advantages of this tire are the following: First, the tire being entirely made of metal, lasts considerably longer than do common tires. Second, this tire may be readily applied to any existing wheel without having to incur expenses for altering or modifying the same. Third, the use of the tire in accordance with this invention dispenses with the employment of any accessory device, as its function as a tire is perfect under all points of view. It will be evident, however, that if desired this tire may be so constructed as to be of reduced weight in order to adapt the same for being placed on the existing tire casings actually in use for protecting and providing the same with a non-skid cover which not only will perfectly answer its purposes as such but will also greatly enhance the appearance of the wheel, to which end the metal parts of the tire may be polished, nickel plated or otherwise finished.

For the clearer understanding of this description, drawings which illustrate, by way of example this invention, are annexed hereto.

In said drawings, Figure 1 shows, in side elevation, a metallic tire constructed in accordance with this invention. Fig. 2 shows means for adapting and fastening the metallic tire to the rim of a common wheel. Fig. 3 shows how the strips which form the resilient means are combined and interlaced or braided.

The tire is formed of tubes of rolled metal of a diameter corresponding to the external diameter and of a width corresponding to the sectional circumference of the same. The outer tube *c* of the tire which is formed of a single piece, is provided, at the place where the same is to come into contact with the ground, with a circular reinforcement *a*, the periphery of which is provided with projections so as to form a rough surface for preventing skidding, as clearly shown in Fig. 3. The inner tube, *b*, is plain.

For the purpose of forming the tire, there are formed at the edges of the tubes the cuts, *d*, which divide the same into a series of strips, *e*, the width of which may increase, as indicated in Fig. 3, according to the degree of resistance required, and arranged more or less obliquely to the plane of the tire. The outer ends, *e'* of the strips *e* extend at right angles to the longitudinally connecting strip which is located at the tread portion of the tire.

The strips being cut in an oblique sense, those of the inner tube will be interlaced with the strips of the outer one, as shown at the central part of Fig. 3, whereupon the whole of the strips are bent until they acquire the curvature and final position shown in Fig. 2; then the ends are folded on the ring *f*, whereby this latter will be conveniently retained so as to assure the stability of the tire as regards the retention of the whole of the strips, while at the same time the mounting of the tire on the fellies of the wheel may be effected with ease.

The tire, constructed as above described, with any of the modifications in the arrangements of the said strips or similar means for allowing of resiliency, may be mounted on the fellies of the wheel and secured thereto by any suitable devices, such as, for instance, the means represented in Fig. 2, which consists of the screws, *h*, conveniently secured at the center of the tire, which screws, at their inner ends, bear a plate, *i*, which, under the action of the screws, bears against the edge of the tire, thereby causing the same to grip in the corresponding grooves of the fellies.

It will be evident that as all the parts composing the tire are made of metal, the appearance of the same may be made to be very showy by polishing, nickel plating, gilding, or painting the outer surface thereof, in accordance with the desire of the purchaser.

Having now clearly described and ascertained the nature of our said invention and in what manner the same is to be performed, we declare that what we claim, is:

A resilient metallic tire for vehicles comprising inner and outer metallic annular bands of arc shaped cross section, said bands having their edges cut obliquely to form strips, the strips formed in the edges of one band extending in an opposite direction to the strips formed in the edges of the other band, the strips on said bands being interlaced with one another to form a unitary device.

LINO EMIDIO SCOTUCCI.
PEDRO ALFREDO EINARSON.

Witnesses:
ANTONIO L. BELLA,
HENRY RUCKER.

Copies of this patent may be obtained for five cents each, by addressing the "Commissioner of Patents, Washington, D. C."